US012487299B2

United States Patent
He et al.

(10) Patent No.: US 12,487,299 B2
(45) Date of Patent: Dec. 2, 2025

(54) MAGNETIC RESONANCE IMAGING DEVICES AND RADIATION THERAPY SYSTEMS INCLUDING THE MAGNETIC RESONANCE IMAGING DEVICES

(71) Applicant: SHANGHAI UNITED IMAGING HEALTHCARE CO., LTD., Shanghai (CN)

(72) Inventors: Shoubo He, Shanghai (CN); Cheng Ni, Shanghai (CN); Feichao Fu, Shanghai (CN); Peng Wang, Shanghai (CN); Zongtai Xie, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 240 days.

(21) Appl. No.: 18/338,311

(22) Filed: Jun. 20, 2023

(65) Prior Publication Data

US 2024/0004003 A1 Jan. 4, 2024

(30) Foreign Application Priority Data

Jun. 20, 2022 (CN) .......................... 202210698263.9
Jun. 20, 2022 (CN) .......................... 202221547606.3

(51) Int. Cl.
*G01V 3/00* (2006.01)
*A61N 5/10* (2006.01)
(Continued)

(52) U.S. Cl.
CPC ..... *G01R 33/34046* (2013.01); *A61N 5/1049* (2013.01); *A61N 5/1077* (2013.01);
(Continued)

(58) Field of Classification Search
CPC .............. G01R 33/5608; G01R 33/385; G01R 33/4824; G01R 33/4828; G01R 33/50; G01R 33/561; A61B 5/4312; A61B 5/004
(Continued)

(56) References Cited

U.S. PATENT DOCUMENTS 6,185,444 B1  2/2001  Ackerman et al.
8,427,148 B2  4/2013  O'Connor
(Continued)

FOREIGN PATENT DOCUMENTS

AU  2013205129 B2  5/2013
AU  2016244213 A1  10/2016
(Continued)

OTHER PUBLICATIONS

EP 0810631 A1 (Charpak) (Year: 1997).*
KR-20140061271-A (Kruip2) (Year: 2014).*

*Primary Examiner* — Walter L Lindsay, Jr.
*Assistant Examiner* — Frederick Wenderoth
(74) *Attorney, Agent, or Firm* — METIS IP LLC

(57) ABSTRACT

The present disclosure provides a magnetic resonance imaging (MRI) device. The MRI device may include a main magnet configured to generate a main magnetic field. The main magnet may form an accommodation space configured to accommodate a target object. The main magnet may include at least one group of main field coils. A direction of the main magnetic field generated by the at least one group of main field coils may form a preset angle with an axial direction of the accommodation space. The at least one group of main field coils may include a first group of main field coils and a second group of main field coils that are arranged oppositely along a radial direction of the accom-
(Continued)

modation space. Each of the first group of main field coils and the second group of main field coils may bend towards each other.

20 Claims, 6 Drawing Sheets

(51) Int. Cl.
  *G01R 33/34* (2006.01)
  *G01R 33/48* (2006.01)
(52) U.S. Cl.
  CPC ... *G01R 33/34023* (2013.01); *G01R 33/4808* (2013.01); *A61N 2005/1055* (2013.01)
(58) Field of Classification Search
  USPC .......................................................... 324/309
  See application file for complete search history.

(56) References Cited

U.S. PATENT DOCUMENTS

| | | | |
|---|---|---|---|
| 8,487,269 B2 | 7/2013 | Amies et al. | |
| 8,903,471 B2 | 12/2014 | Heid | |
| 8,958,864 B2 | 2/2015 | Amies et al. | |
| 9,099,271 B2 | 8/2015 | Constantin et al. | |
| 9,664,763 B2 | 5/2017 | Amthor et al. | |
| 10,061,000 B2 | 8/2018 | Longfield | |
| 10,307,616 B2 | 6/2019 | Vahala et al. | |
| 10,890,638 B2 | 1/2021 | Rahmer et al. | |
| 10,898,726 B2 | 1/2021 | Ritter | |
| 10,960,229 B2 | 3/2021 | Ni et al. | |
| 11,116,418 B2 | 9/2021 | Harvey | |
| 2001/0001807 A1 | 5/2001 | Green | |
| 2007/0078079 A1 | 4/2007 | Zumbrunn et al. | |
| 2010/0254897 A1 | 10/2010 | Frank et al. | |
| 2010/0285030 A1 | 11/2010 | Bowdish et al. | |
| 2011/0080239 A1* | 4/2011 | Westphal | G01R 33/3815 324/307 |
| 2011/0196226 A1 | 8/2011 | Gross et al. | |
| 2011/0200611 A1 | 8/2011 | Sexton | |
| 2011/0311474 A1 | 12/2011 | Wishart et al. | |
| 2013/0197351 A1 | 8/2013 | Heid | |
| 2014/0128719 A1* | 5/2014 | Longfield | G01R 33/3815 600/411 |
| 2014/0232394 A1 | 8/2014 | Kim et al. | |
| 2014/0275963 A1 | 9/2014 | Shvartsman et al. | |
| 2015/0210769 A1 | 7/2015 | Freeman et al. | |
| 2016/0073926 A1 | 3/2016 | Grodzki et al. | |
| 2016/0144200 A1 | 5/2016 | Leach et al. | |
| 2016/0256712 A1 | 9/2016 | Vahala et al. | |
| 2016/0310761 A1 | 10/2016 | Li et al. | |
| 2017/0014643 A1 | 1/2017 | Wirtz et al. | |
| 2017/0281043 A1 | 10/2017 | Shvartsman et al. | |
| 2018/0180693 A1 | 6/2018 | Boernert et al. | |
| 2018/0194858 A1 | 7/2018 | Hay et al. | |
| 2019/0126072 A1 | 5/2019 | Vahala et al. | |
| 2019/0209869 A1* | 7/2019 | Liu | A61N 5/1071 |
| 2019/0353725 A1 | 11/2019 | Dempsey et al. | |
| 2020/0246637 A1 | 8/2020 | Wang et al. | |
| 2021/0031055 A1 | 2/2021 | Jiang et al. | |
| 2021/0156936 A1 | 5/2021 | Popescu | |
| 2021/0393983 A1 | 12/2021 | Ni et al. | |

FOREIGN PATENT DOCUMENTS

| | | | |
|---|---|---|---|
| CN | 205411948 U | 8/2016 | |
| CN | 107088268 A | 8/2017 | |
| CN | 107137826 A | 9/2017 | |
| CN | 105363138 B | 1/2018 | |
| CN | 108014428 A | 5/2018 | |
| CN | 208426553 U | 1/2019 | |
| CN | 109712773 A * | 5/2019 | |
| CN | 111228657 A | 6/2020 | |
| CN | 110833414 B | 11/2021 | |
| EP | 3011354 B1 | 12/2020 | |
| EP | 3308185 B1 | 10/2021 | |
| EP | 3915481 A1 | 12/2021 | |
| GB | 2427479 A * | 12/2006 | ........... A61N 5/1049 |
| JP | 2012109258 A * | 6/2012 | |
| JP | 2014209485 A * | 11/2014 | ............... A61N 5/10 |
| WO | 2007021494 A2 | 2/2007 | |
| WO | WO-2013046957 A1 * | 4/2013 | ......... G01R 33/3854 |
| WO | 2013116645 A1 | 8/2013 | |
| WO | 2017157880 A1 | 9/2017 | |
| WO | 2018020879 A1 | 2/2018 | |
| WO | 2021204640 A1 | 10/2021 | |
| WO | 2021228703 A1 | 11/2021 | |
| WO | 2021253251 A1 | 12/2021 | |

* cited by examiner

MAGNETIC RESONANCE IMAGING DEVICES AND RADIATION THERAPY SYSTEMS INCLUDING THE MAGNETIC RESONANCE IMAGING DEVICES

CROSS-REFERENCE TO RELATED APPLICATION

This application claims priority of Chinese Patent Application No. 202210698263.9, filed on Jun. 20, 2022, and Chinese Patent Application No. 202221547606.3, filed on Jun. 20, 2022, the contents of each of which are incorporated herein by reference.

TECHNICAL FIELD

This disclosure generally relates to radiation therapy systems, and more particularly, to an image-guided radiography system including a radiation therapy (RT) device and a magnetic resonance imaging (MRI) device.

BACKGROUND

Currently, in different treatment sessions, it is difficult to track changes (e.g., motions) of a tumor, which affects the radiography treatment of the tumor. Various imaging technologies can provide images of the tumor before and/or after each treatment session. For example, the MRI device can be used in combination with an RT device to provide MRI(s) images of the tumor. Generally, the particle accelerator of the RT device produces X-radiation rays by accelerating particles to a target or direct particle radiation. In occasions without an outer magnetic field, a beam of particles (or particle beam) travels along a straight line (i.e., a straight trajectory). In occasions with an outer magnetic field, charged particles of the particle beam would deviate from the straight trajectory due to the Lorentz force. In some embodiments, the magnetic field of the MRI device may interfere with the normal operation of the particle accelerator of the RT device, and/or magnetic components of the particle accelerator may cause artifacts and/or image distortion of the MRI image(s). Therefore, it is desirable to provide an effective treatment system, which can reduce or remove the interference between the magnetic field of the MRI device and the charged particles of the accelerator.

SUMMARY

In one aspect of the present disclosure, a magnetic resonance imaging (MRI) device is provided. The MRI device may include a main magnet configured to generate a main magnetic field. The main magnet may form an accommodation space configured to accommodate a target object. The main magnet may include at least one group of main field coils. A direction of the main magnetic field generated by the at least one group of main field coils may form a preset angle with an axial direction of the accommodation space. The at least one group of main field coils includes a first group of main field coils and a second group of main field coils that are arranged oppositely along a radial direction of the accommodation space. Each of the first group of main field coils and the second group of main field coils may bend towards each other.

In some embodiments, the each of the at least one group of main field coils may include one or more bent parts. Each of the one or more bent parts may be formed by two adjacent segments which form a bending angle equal to or greater than a preset angle.

In some embodiments, the at least one group of main field coils may include at least one of a saddle coil, a cos-theta coil, or a racetrack coil.

In some embodiments, each group of the at least one group of the main field coils may include one or more coils.

In some embodiments, the one or more coils of the each group may include a superconducting coil.

In some embodiments, the at least one group of main field coils may be arranged in parallel along an axial direction of the accommodation space.

In some embodiments, the at least one group of main field coils may include a group of main field coils that are nested.

In some embodiments, the MRI device may further include a radiography component including a radiation source. The radiation source may be configured to transmit a radiation beam to at least one part of a region of interest (ROI) of the target object.

In some embodiments, the MRI device may further include at least one first opening hole through which the radiation beam is delivered towards the at least one part of the ROI of the target object.

In some embodiments, the radiography component may include a detector arranged oppositely to the radiation source. The detector may be configured to receive the radiation beam.

In some embodiments, the MRI device may further include at least one second opening hole through which the radiation beam is received by the detector. The at least one second opening hole may be arranged oppositely to the at least one first opening hole.

In some embodiments, the at least one group of main field coils may be cooled by conduction cooling.

In another aspect of the present disclosure, a system is provided. The system may include a vacuum container configured to form an accommodation space extending along an axial direction and configured to accommodate a target object. The system may also include a main magnet including at least one group of main field coils and configured to generate a main magnetic field for imaging the target object. The main magnet may be disposed in the vacuum container, and the at least one group may include a first group of main field coils and a second group of main field coils that are oppositely arranged along a radial direction of the accommodation space. The system may further include a radiation source configured to treat the target object. The radiation source may be disposed at a first opening hole of the vacuum container, and a deviation between a direction of the main magnetic field and a direction of a central ray of the radiation source may be less than or equal to a threshold.

In some embodiments, the system may further include a vacuum container configured to form the accommodation space extending along the axial direction.

In some embodiments, the main magnet may be disposed in the vacuum container, and the radiation source may be disposed outside the vacuum container.

In some embodiments, the radiation source and the vacuum container may be configured to rotate synchronously.

In some embodiments, the system may further include a detector configured to receive a radiation beam of the radiation source. The detector may be arranged oppositely to the radiation source.

In some embodiments, the vacuum container may include a second opening hole, the detector may be disposed at the second opening hole, and the second opening hole and the first opening hole may be arranged on two sides of the vacuum container oppositely.

In some embodiments, the system may further include a gantry. The vacuum container may be mounted on the gantry, such that the vacuum container is capable of rotating around an axis of the accommodation space with respect to the gantry.

In some embodiments, the system may further include at least two gantries. A first gantry of the at least two gantries may be configured to fix the radiation source, and a second gantry of the at least two gantries may be configured to fix the vacuum container.

In some embodiments, at least a portion of a projection of the radiation source along a radial direction of the accommodation space may fall in a region enclosed by the at least one group of main field coils.

In some embodiments, the at least one group of main field coils may include a first group of main field coils and a second group of main field coils. The first group of main field coils and the second group of main field coils may be arranged on two sides of the accommodation space oppositely.

In some embodiments, the main magnet and the radiation source may rotate around an axis of the accommodation space synchronously.

In some embodiments, the system may further include at least one group of shielding coils configured to shield the at least one group of main field coils and prevent the at least one group of main field coils from interfering the radiation source in treating the target object.

In some embodiments, the at least one group of shielding coils may include a first group of shielding coils and a second group of shielding coils. The first group of shielding coils may be disposed in the accommodation space and outside the first group of main field coils. The second group of shielding coils may be disposed in the accommodation space and outside the second group of main field coils.

In some embodiments, the threshold may relate to at least one of an intensity of the main magnetic field or a size of a wall surface of the radiation source.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
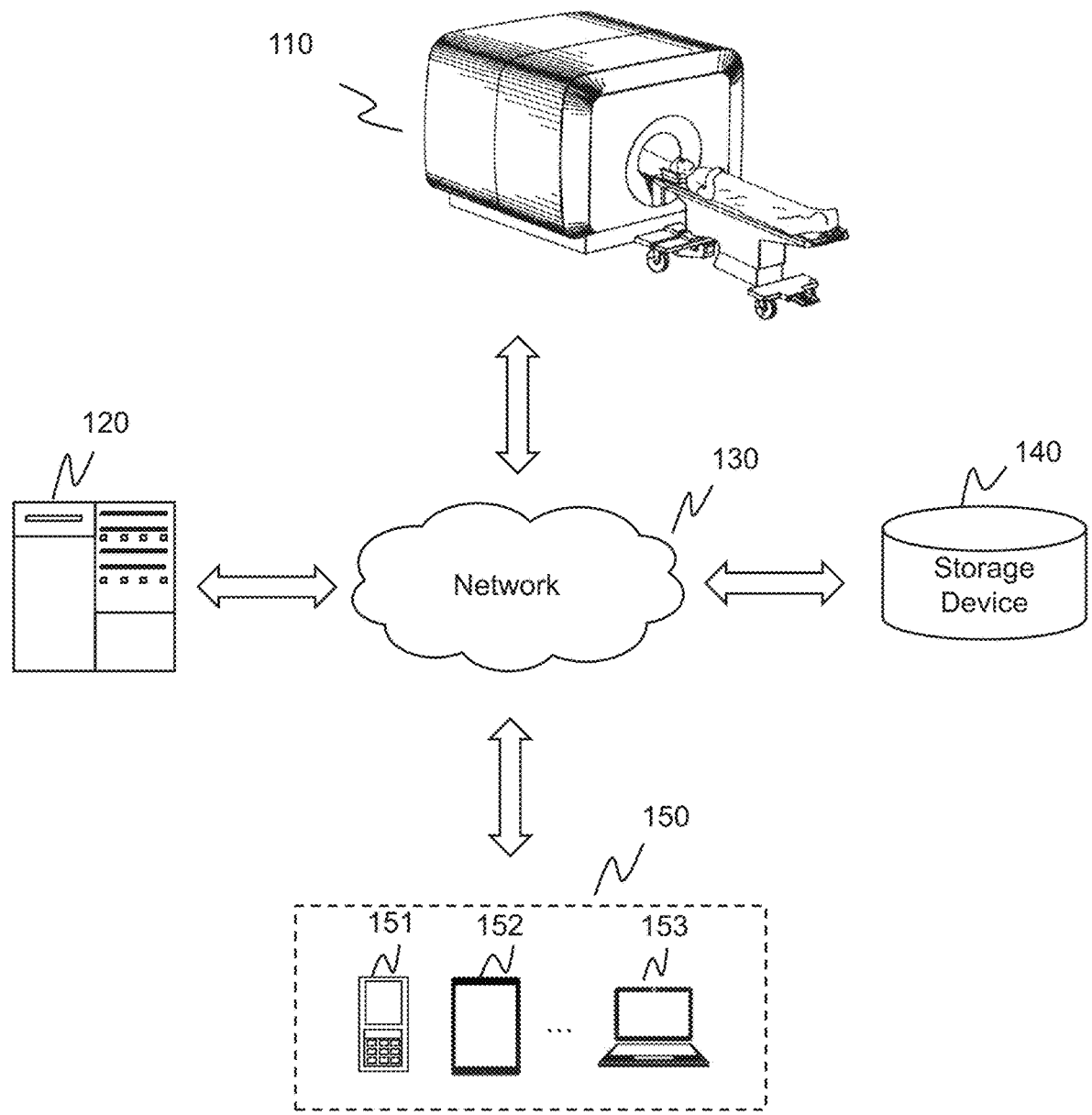
FIG. 1 is a schematic diagram illustrating an exemplary medical system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

As used herein, the term "and/or" includes any and all combinations of one or more of the associated listed items. In the present disclosure, unless otherwise expressly specified, the terms "mount," "connect," "couple," "fix," etc., should be understood in a broad sense, for example, it may be a fixed connection, a detachable connection, integrated into a whole, a mechanical connection, an electrical connection, directly connected, or indirectly connected via an intermediate medium, an internal connection of two elements, or an interconnection of two elements. For those skilled in the art, the specific meanings of the above terms in the present disclosure may be understood according to specific circumstances.

In the present disclosure, spatial reference terms such as "center," "longitudinal," "transverse," "length," "width," "thickness," "upper," "lower," "front," "back," "left," "right," "vertical," "horizontal," "top," "bottom," "inner," "outer," "clockwise," "counterclockwise," "axial," "radial," "circumferential," etc., indicate, in a relative sense, an orientation or positional relationship between two or more elements, assemblies, devices, or systems based on an orientation or positional relationship as shown in the drawings, and are only for the convenience and simplicity of description, rather than indicating or implying that the elements, assemblies, devices, or systems in the present disclosure have a particular orientation when the disclosed system, or a portion thereof, is in operation, or are constructed and operated in a particular orientation, and therefore should not be understood as a limitation of the present disclosure.

In the present disclosure, unless expressly stated otherwise, a first feature being "above" or "below" a second feature may be that the first feature and the second feature are in direct contact, or the first feature and the second feature may be in indirect contact via an intermediate medium. In some embodiments, the first feature being "above" or "on" the second feature may mean that the first feature is directly above or obliquely above the second feature, or simply mean that a horizontal height of the first feature is higher than a horizontal height of the second feature. The first feature being "below" or "underneath" the second feature may mean that the first feature is directly below or obliquely below the second feature, or it may simply mean that a horizontal height of the first feature is smaller than a horizontal height of the second feature.

It will be understood that, although the terms "first," "second," "third," etc., may be used herein to distinguish one element from another. For example, a first element may be termed a second element, and similarly, a second element may be termed a first element, without departing from the scope of exemplary embodiments of the present disclosure.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

According to an aspect of the present disclosure, an MRI device is provided. The MRI device may include a main magnet configured to generate a main magnetic field. The main magnet may form an accommodation space configured to accommodate a target object. The main magnet may include at least one group of main field coils. A direction of the main magnetic field generated by the at least one group of main field coils may form a preset angle with an axial direction of the accommodation space.

According to another aspect of the present disclosure, a treatment system is provided. The treatment system may include an accommodation space extending along an axial direction and configured to accommodate a target object. The treatment system may also include a main magnet including at least one group of main field coils and configured to generate a main magnetic field for imaging the target object. The treatment system may also include a radiation source configured to treat the target object. A deviation between a direction of the main magnetic field and a direction of a central ray of the radiation source may be less than or equal to a threshold.

In some embodiments, the main field coils in the present disclosure may have a three-dimensional shape distributed on two or more planes, which can generate higher magnetic field or generate a magnetic field with a larger shimming area in comparison with racetrack coils. In other words, to generate magnetic fields with the same intensity or the same shimming area, the mass of the coils with the three-dimensional shape distributed on two or more planes may be smaller than that of the racetrack coils. The smaller the mass of the coils is, the lighter the MRI device including the coils may be. In some embodiments, in comparison with the racetrack coils, the edge of the coils with the three-dimensional shape distributed on two or more planes may be closer to a central region of the accommodation space. In some embodiments, the MRI device in the present disclosure can generate the main magnetic field B0 that has a consistent direction with the radiation beam (also referred to as the treatment beam) of the RT device, such that the transverse deviation of the particles can be reduced or avoided, thereby the radiation beam can be accelerated and transmitted stably in a high magnetic field. The central magnetic field of the MRI device may be designed or configured with high intensity. In some embodiments, the main magnetic field generated by the MRI device may have a consistent direction with the treatment beam, which can prevent the radiation beam from hitting the wall of the accommodation space under the interference of the main magnetic field during the acceleration or transmission of the particles, thereby avoiding or reducing the loss of the particles and improving a dosage rate of the MRI-guided RT device. Further, the transmission rate of the treatment beam reaching the isocentric region of the accommodation space of the MRI device may be accelerated, and the difficulty of design and/or manufacture of the magnetic shielding of the MRI device is reduced, thereby ensuring the homogeneity/uniformity of the magnetic field of the MRI device.

FIG. 1 is a schematic diagram illustrating an exemplary medical system according to some embodiments of the present disclosure. In some embodiments, the medical system 100 may include an imaging system. The imaging system may include a single-modality imaging system or a multi-modality imaging system. The single-modality imaging system may include an MRI system. The multi-modality imaging system may include a computing tomography-magnetic resonance imaging (CT-MRI) system, a positron emission tomography-magnetic resonance imaging (PET-MRI) system, a single photon emission computed tomography-magnetic resonance imaging (SPECT-MRI) system, a digital subtraction angiography-magnetic resonance imaging (DSA-MRI) system, etc. In some embodiments, the medical system 100 may include a treatment system. The treatment system may include a treatment planning system (TPS), an image-guided radiotherapy (IGRT) system, etc. The IGRT system may include a radiotherapy device (also referred to as a radiation therapy device or a treatment device) and an imaging device. The radiotherapy device may include a radiation source. The radiation source may include a linear accelerator, a circular accelerator, a synchrotron, etc. The radiotherapy device may be configured to give radiation therapy to an object. The radiotherapy device may include an accelerator of particles with particle types, including, for example, photons, electrons, protons, or heavy ions. The imaging device may include an MRI scanner, etc.

As illustrated, the medical system 100 may include a medical device 110, one or more processing devices 120, a network 130, a storage device 140, and one or more terminal devices 150. The components of the medical system 100 may be connected in one or more of various ways. Merely by way of example, as illustrated in FIG. 1, the medical device 110 may be connected to the processing device 120 through the network 130. As another example, the medical device 110 may be connected to the processing device 120 directly (as indicated by the bi-directional arrow in dotted lines linking the medical device 110 and the processing device 120). As a further example, the storage device 140 may be connected to the processing device 120 directly or through the network 130. As still a further example, a terminal device (e.g., terminal devices 151, 152, and/or 153) may be connected to the processing device 120 directly (as indicated by the bi-directional arrow in dotted lines linking the terminal device 150 and the processing device 120) or through the network 130.

The medical device 110 may include a magnetic resonance imaging (MRI) component (also referred to as an MRI device). The MRI device may scan an object or a portion thereof and generate image data relating to MRI signals. In the present disclosure, "subject" and "object" are used interchangeably. Merely by way of example, the object may include a patient, a man-made object, etc. In some embodiments, the object may include a specific portion, organ, and/or tissue of a patient. For example, the object may include head, brain, neck, body, shoulder, arm, thorax, cardiac, stomach, blood vessel, soft tissue, knee, feet, or the like, or any combination thereof. In some embodiments, the medical device 110 may transmit image data to the one or more processing devices 120, the storage device 140 and/or the terminal device 150 for further processing. For example, the image data may be sent to the one or more processing devices 120 for generating an MRI image or be stored in the storage device 140.

In some embodiments, the medical device 110 may further include a radiation therapy component (hereinafter also referred to as "a radiotherapy device" or "a radiotherapy component"). The radiotherapy device may deliver radiation for the treatment of a targeted area (e.g., a tumor). As used herein, the radiation may include particle rays, photon rays, or the like. The particle rays may include neutrons, protons, electrons, muons, heavy ions, alpha rays, or the like, or any combination thereof. The photon rays may include X-rays, gamma rays, ultraviolet rays, lasers, or the like, or any combination thereof. In some embodiments, the radiotherapy device may generate, with the aid of image data provided by the MRI device, a certain dose of radiation rays for radiotherapy. For example, the image data may be processed to locate the tumor and/or determine the dose of the radiation rays.

The one or more processing devices 120 may process data and/or information obtained from the medical device 110, the storage device 140, and/or the terminal device 150. For example, the one or more processing devices 120 may process image data and reconstruct at least one MRI image based on the image data. As another example, the one or more processing devices 120 may determine a location of a treatment region and/or a radiation dose based on the at least one MRI image. The MRI image(s) may provide advantages such as excellent soft-tissue contrast, high resolution, and/or geometric accuracy, which can allow precise localization of the treatment region. The MRI image(s) may be used to detect changes (e.g., a tumor regression or metastasis) in the treatment region during treatment planning and delivery, so that the original treatment plan can be adjusted accordingly. The original treatment plan may be determined before a treatment begins. For example, the original treatment plan may be determined at least one day, three days, one week, two weeks, or one month, etc. before the treatment begins.

In some embodiments, the one or more processing devices 120 may be a single processing engine that communicates with the medical device 110 and processes data from the MRI device and/or the radiotherapy device. Alternatively, the one or more processing devices 120 may include at least two processing engines. One of the at least two processing engines may communicate with the MRI device of the medical device 110 and process data, and the other of the at least two processing engines may communicate with the radiotherapy device of the medical device 110 and process data. In some embodiments, the one or more processing devices 120 may include a treatment planning system. The at least two processing engines may communicate with each other. In some embodiments, the one or more processing devices 120 may include a single server or a group of servers. The server groups may be centralized or distributed. In some embodiments, the one or more processing devices 120 may be local or remote to medical device 110. For example, the one or more processing devices 120 may access information and/or data from the medical device 110, the storage device 140, and/or the terminal device 150 via the network 130. As another example, the one or more processing devices 120 may be directly connected with the medical device 110, the terminal device 150, and/or the storage device 140 to access information and/or data. In some embodiments, the one or more processing devices 120 may be implemented on a cloud platform. The cloud platform may include a private cloud, a public cloud, a hybrid cloud, a community cloud, a distributed cloud, an inter-cloud, a multi-cloud, or the like, or any combination thereof.

The network 130 may include any suitable network that can facilitate the exchange of information and/or data for medical system 100. In some embodiments, one or more components (e.g., the medical device 110, the one or more processing devices 120, the storage devices 140, or the terminal device 150) of the medical system 100 may communicate information and/or data with one or more other components of the medical system 100 via the network 130. For example, the one or more processing devices 120 may obtain image data from the medical device 110 via the network 130. As another example, the one or more processing devices 120 may obtain a user instruction from the terminal device 150 via the network 130. The network 130 may include a public network (e.g., the Internet), a private network (e.g., a local area network (LAN), or a wide area network (WAN)), a wired network (e.g., an Ethernet network), a wireless network (e.g., a 802.11 network, or a Wi-Fi network), a cellular network (e.g., a Long Term Evolution (LTE) network), a frame relay network, a virtual private network ("VPN"), a satellite network, a telephone network, a router, a hub, a switch, a server computer, or the like, or any combination thereof. In some embodiments, the network 130 may include one or more network access points. For example, the network 130 may include wired and/or wireless network access points, such as base stations and/or Internet exchange points, through which one or more components of the medical system 100 may connect to the network 130 to exchange data and/or information.

The storage device 140 may store data, instructions, and/or any other information. In some embodiments, the storage device 140 may store data obtained from the one or more processing devices 120 and/or the terminal device 150. In some embodiments, the storage device 140 may store data and/or instructions that can be executed or used by the one or more processing devices 120 to perform exemplary methods described herein. In some embodiments, the storage device 140 may include a mass storage device, a removable storage device, a cloud-based storage device, a volatile read-write memory, a read-only memory (ROM), or the like, or any combination thereof. Exemplary mass storage device may include a magnetic disk, an optical disk, a solid state drive, or the like. Exemplary removable storage device may include a flash drive, a floppy disk, a compact disk, a memory card, a compact disk, a magnetic tape, or the like. Exemplary volatile read-write memory may include a random access memory (RAM). Exemplary RAMs may include a dynamic RAM (DRAM), a double rate synchronous dynamic RAM (DDR SDRAM), a static RAM (SRAM), a thyristor RAM (T-RAM), a zero capacitor RAM (Z-RAM), or the like. Exemplary ROMs may include a mask ROM (MROM), a programmable ROM (PROM), an erasable programmable ROM (EPROM), an electrically erasable programmable ROM (EEPROM), a compact disc ROM (CD-ROM), a digital function disk ROM, etc. In some embodiments, the storage device 140 may be provided on a cloud platform as described elsewhere in the present disclosure. In some embodiments, the storage device 140 may be connected to the network 130 to communicate with one or more other components (e.g., one or more processing devices 120 or the terminal device 150) of the medical system 100. One or more components of the medical system 100 may access data or instructions stored in storage device 140 via the network 130. In some embodiments, the storage device 140 may be part of the one or more processing devices 120.

The terminal device 150 may connect and/or communicate with the medical device 110, the one or more processing devices 120, and/or the storage device 140. For example, the one or more processing devices 120 may obtain a scan protocol from the terminal device 150. As another example, the terminal device 150 may obtain image data from the medical device 110 and/or the storage device 140. In some embodiments, the terminal device 150 may include a mobile device 151, a tablet computer 152, a laptop computer 153, or the like, or any combination thereof. For example, the mobile device 151 may include a mobile phone, personal digital assistant (PDA), a gaming device, a navigation device, a point-of-sale (POS) device, a laptop computer, a tablet computer, a desktop computer, or the like, or any combination thereof. In some embodiments, the terminal device 150 may include an input device, an output device, or the like. The input device may include alphanumeric and other keys that can be entered through a keyboard, a touch screen (e.g., with tactile or tactile feedback), a voice input, an eye tracking input, a brain monitoring system, or any other similar input mechanism. Input information received via the input device may be transmitted via, for example, a bus, to one or more processing devices 120 for further processing. Other types of the input devices may include a cursor control device such as a mouse, a trackball, or cursor direction keys. The output device may include a display, a speaker, a printer, or the like, or any combination thereof. In some embodiments, the terminal device 150 may be part of the one or more processing devices 120.

The above description is provided for illustration purposes, and not intended to limit the scope of the present disclosure. Many alternatives, modifications and variations would be apparent to those of ordinary skills in the art. The features, structures, methods, and characteristics of the exemplary embodiments described herein may be combined in various ways to obtain additional and/or alternative exemplary embodiments. For example, the storage device 140 may be a data storage device including a cloud computing platform, such as a public cloud. In some embodiments, the one or more processing devices 120 may be integrated into the medical device 110. However, such changes and modifications do not depart from the scope of the present disclosure.

Figure 2:
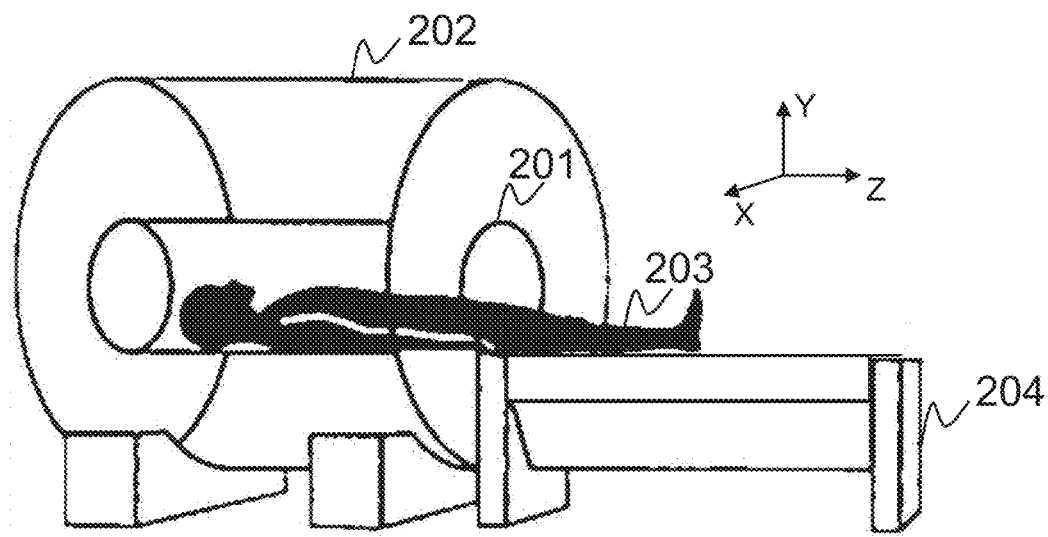
FIG. 2 is a schematic diagram illustrating an exemplary medical device according to some embodiments of the present disclosure.

FIG. 2 is a schematic diagram illustrating an exemplary medical device according to some embodiments of the present disclosure. The medical device as shown in FIG. 2 is an exemplary embodiment of the medical device 110 in FIG. 1. The medical device may include an MRI device 200. As shown in FIG. 2, the MRI device 200 may include an accommodation space 201, a main magnet 202, one or more gradient coils (not shown), and one or more radio frequency (RF) coils (not shown).

As shown in FIG. 2, X-axis, Y-axis and Z-axis may form an orthogonal coordinate system. The X-axis and Z-axis are horizontal, and the Y axis is vertical. As shown in FIG. 2, the positive direction of the X-axis may be viewed from the direction facing the front of the MRI device 200, from the right side to the left side of the MRI device 200; the positive direction of the Y-axis may be from the bottom to the top of the MRI device 200; the positive direction of the Z-axis may refer to the direction along which a target object 203 is moved out of the accommodation space 201 of the MRI device 200, from the back of the MRI device 200 to the front.

In some embodiments, according to the type of the main magnet 202, the MRI device 200 may include a permanent magnet MRI scanner, a superconducting electromagnet MRI scanner, a resistive electromagnet MRI scanner, etc. In some embodiments, according to the strength of the magnetic field, the MRI device 200 may include a high-field MRI scanner, a mid-field MRI scanner, a low-field MRI scanner, etc. In some embodiments, the MRI device 200 may include a closed bore (cylindrical) type, an open bore type, or the like.

The main magnet 202 may generate a static magnetic field B0 through at least one main field coil. The main magnet 202 may be of various types, including, for example, a permanent magnet, a superconducting electromagnet, a resistive electromagnet, or the like. The superconducting electromagnet may include alloys of niobium, vanadium, technetium, copper oxide, or the like, or any combination thereof. The main magnet 202 may form an accommodation space 201 extending along an axial direction (e.g., the Z direction shown in FIG. 2) for accommodating a target object 203. In some embodiments, the shape of the main magnet 202 may be annular, or any other shape.

In some embodiments, the main magnet 202 may include at least one group of main field coils (e.g., one or more groups of main field coils). The at least one group of main field coils may be arranged in parallel along an axial direction or oppositely arranged along a radial direction of the accommodation space. For example, the main magnet 202 may include a first group of main field coils and a second group of main field coils that are arranged oppositely along a radial direction (e.g., the y-axis direction) of the accommodation space 201. In some embodiments, each of the at least one group of main field coils (e.g., each of the first group of main field coils and the second group of main field coils) may bend towards each other. For example, the first group of main field coils may bend towards the second group of main field coils, and the second group of main field coils may bend towards the first group of main field coils. As another example, each of the first group of main field coils and the second group of main field coils may bend towards the axial direction of the accommodation space (e.g., as shown in the coils 300-2, 300-3, 400-1, etc.). The first group of main field coils and/or the second group of main field coils may include at least one main field coil. As another example, the main magnet 202 may include a third group of main field coils. The third group of main field coils and the first group of main fields coils may be arranged in parallel along an axial direction (e.g., the z-axis direction) of the accommodation space 201. In some embodiments, each group of the at least one group of main field coils may include one or more coils (e.g., one or more main field coils such as superconducting coils). The one or more coils may be made of a superconducting material. For example, the superconducting material may include NbTi, $Nb_3Sn$, $MgB_2$, BSCCO, YBCO, or the like, or any combination thereof.

Figure 3:
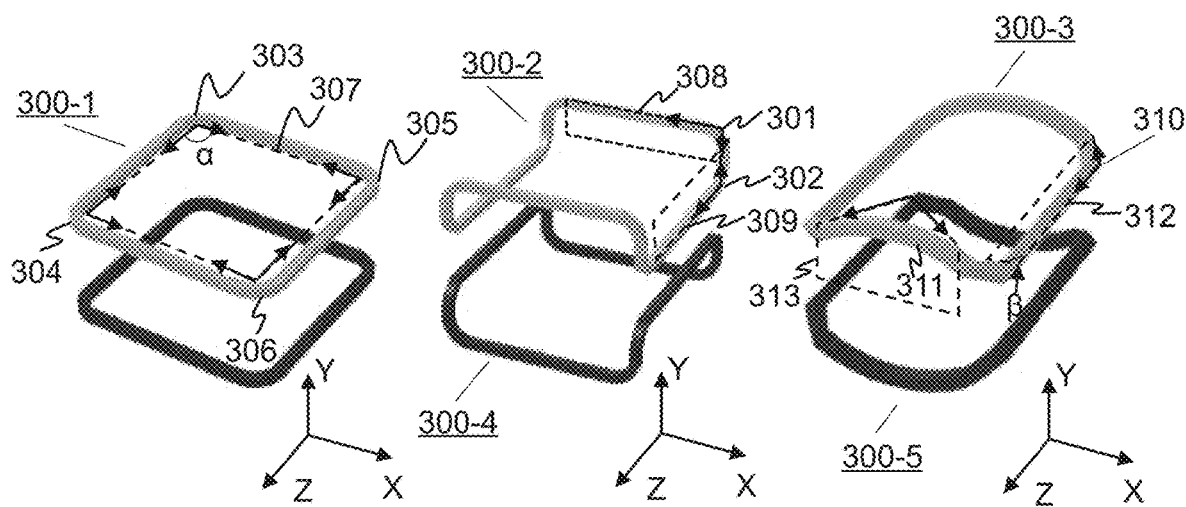
FIG. 3 is a schematic diagram illustrating exemplary main field coils according to some embodiments of the present disclosure.

In some embodiments, each of the at least one group of main field coils (e.g., a main field coil) of the main magnet 202 may be wound to have a planar shape or a three-dimensional shape distributed on two or more planes. For the three-dimensional shape, in a three-dimensional plane (e.g., the X-Y plane, the Y-Z plane, or the X-Z plane), a profile of each of the at least one group of main field coils may include a plurality of segments. The plurality of segments may include a plurality of segments. The plurality of segments may include two segments located in a first plane and two segments located in a second plane. The first plane and the second plane may have an angle larger than 0. For example, each of the at least one group of main field coils may include at least two bent parts. Each of the one or more bent parts may be formed by two adjacent segments of the plurality of segments. The two adjacent segments may form a bending angle (e.g., angle α or β as shown in FIG. 3) equal to or greater than a preset angle (e.g., 60 degrees, 80 degrees, 90 degrees, 120 degrees, etc.). The bending directions of the at least two bent parts of the main field coil may correspond to different planes. As used herein, a bending direction of a bent part may refer to an extending direction or a tangential direction of two segments of the bent part. In some embodiments, the main field coil of the main magnet 202 may include at least one of a racetrack coil (e.g., a racetrack coil 300-1), a saddle coil (e.g., a saddle coil 300-2 or 300-4), or a cos-theta coil (e.g., a cos-theta coil 300-3 or 300-5). In some embodiments, the shapes of the main field coils of the main magnet 202 may be the same or different. For example, the main field coils of the main magnet 202 may be saddle coils or cos-theta coils. As another example, the first group of main field coils may include a saddle coil and a cos-theta coil. As another example, the first group of main field coils may include saddle coils, and the second group of main field coils may include cos-theta coils. More descriptions regarding the main field coils may be found elsewhere in the present disclosure (e.g., FIG. 3 and the relevant descriptions thereof). As another example, the main magnet 202 may include only one group of main field coils. To reach the same magnetic flux, the main magnet 202 including only one group of main field coils may be wound by thinner coils that pass a larger current than the main magnet 202 including two groups of main field coils.

Figure 9:
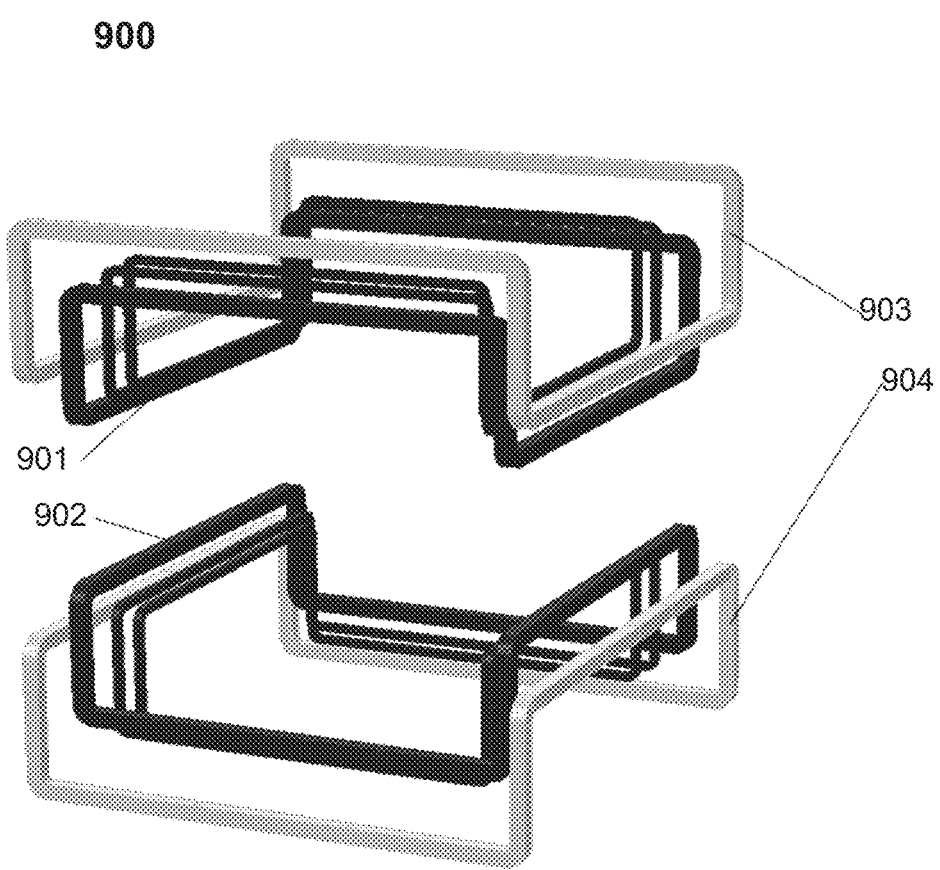
FIG. 9 is a schematic diagram illustrating an exemplary main magnet according to some embodiments of the present disclosure.

In some embodiments, at least two main field coils of the first group of main field coils and/or the second group of main field coils may be stacked along the radial direction of the accommodation space 201. For example, the first group of main field coils may include at least two main field coils that are stacked along the radial direction of the accommodation space 201. As another example, the second group of main field coils may include at least two main field coils that are stacked along the radial direction of the accommodation space 201. In some embodiments, the at least two main field coils of the first group of main field coils and/or the second group of main field coils may be tiled along the circumferential direction and/or axial direction of the accommodation space 201. In some embodiments, at least one group of main field coils may include a group of main field coils that are nested (e.g., as shown in FIG. 9). For example, at least two main field coils of the first group of main field coils may be nested. As another example, at least two main field coils of the second group of main field coils may be nested. In some embodiments, the at least two main field coils may be connected in series. For example, the at least two main field coils may be connected through superconducting joints.

In some embodiments, the first group of main field coils and the second group of main field coils arranged oppositely along the radial direction may form a dipole field region between the first group of main field coils and the second group of main field coils (e.g., in the accommodation space 201), thereby generating a main magnetic field that forms a preset angle (e.g., greater than 0 degrees and less than or equal to 90 degrees) with the axial direction (e.g., Z direction), for example, generating a magnetic field perpendicular to the axial direction (e.g., Z direction).

In some embodiments, if a racetrack coil is made into a coil (e.g., the main field coil) with a three-dimensional shape that is not on the same plane (i.e., distributed on two or more planes), the coil with the three-dimensional shape that is not on the same plane may have a smaller projection area along the direction of the main magnetic field than the racetrack coil. According to the principle of magnetic flux, in an occasion that the magnetic flux is constant (e.g., a current passing through the coil is consistent), the smaller the area perpendicular to the magnetic field line that the magnetic field passes is, the greater the strength of the magnetic field may be. That is, in the case of the same coil mass, a coil with a three-dimensional shape that is not on the same plane may generate a stronger magnetic field or generate a magnetic field with a larger shimming area. From another point of view, if it is necessary to generate a magnetic field with the same strength or the same shimming area, the mass of the coil with a three-dimensional shape that is not on the same plane may be smaller than the mass of a racetrack coil, and the smaller mass of the coil would make the MRI device lighter.

Figure 4:
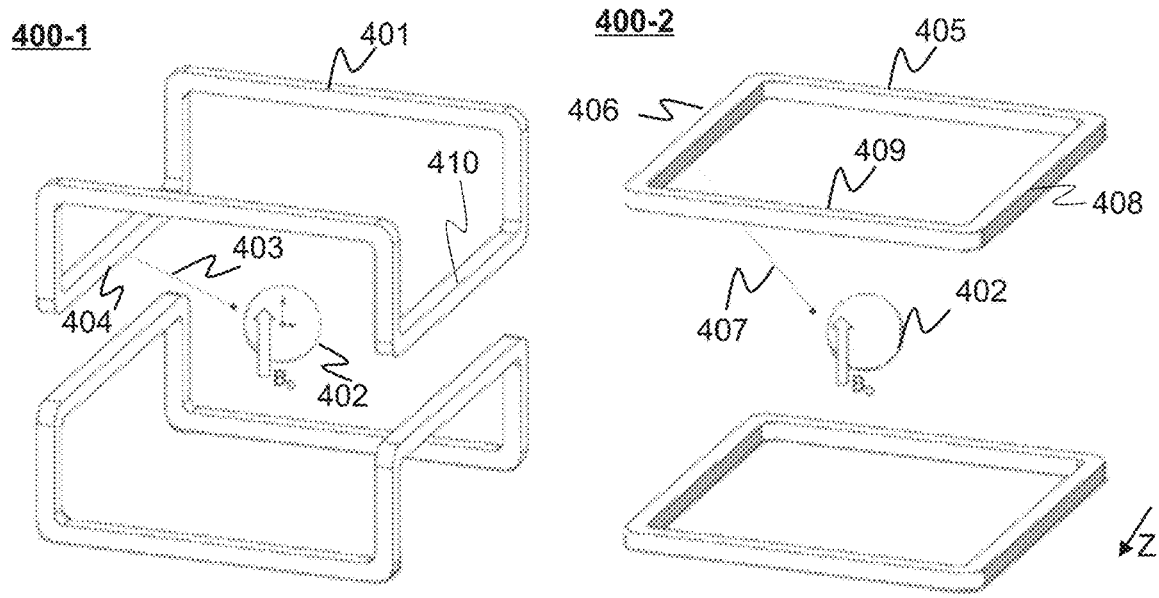
FIG. 4 is a schematic diagram illustrating exemplary main field coils according to some embodiments of the present disclosure.

In addition, taking a saddle coil as an example, as shown in FIG. 4, if the distance between a segment 401 of a saddle coil 400-1 and a central area 402 of the accommodation space 201 is equal to the distance between a segment 405 of a racetrack coil 400-2 and the accommodation space 201, a segment 404 (or a segment 410) of the saddle coil 400-1 may be regarded as being bent along a direction close to the central area 402, so that the saddle coil 400-1 can have a three-dimensional shape that is not on the same plane. In comparison with a segment 406 of the racetrack coil 400-2, the segment 404 of the saddle coil 400-1 may be closer to the central area 402 (i.e., the distance 403 (between the segment 404 and the central area 402) is smaller than the distance 407 (between the side 406 and the central area 402)), thus the segment 404 of the saddle coil 400-1 contributes more to the central field than the side 406 of the racetrack coil 400-2.

In some embodiments, different parts of a main magnet coil of the at least one group of main field coils may have different thicknesses. Taking a racetrack coil 400-2 as an example, the racetrack coil 400-2 may include four sides 405, 406, 408, and 409. The sides 405 and 409 may be arranged parallel to the X-axis, and the sides 406 and 408 may be arranged perpendicular to the X-axis. Merely by way of example, the thicknesses of the sides 405 and 409 may be different from (e.g., greater than) the thicknesses of the sides 406 and 408. As another example, the distances between the sides 406 and 408 may be different from (e.g., greater than) the distance between the sides 405 and 409. During the main magnet design, the farther away the side 406 is from the side 408, and/or the thicker the sides 406 and 408 are, the better the main magnet may be. Similarly, during the main magnet design, the farther away the segment 404 is from the segment 410, and/or the thicker the segments 404 and 410 are, the better the main magnet may be. In some embodiments, the racetrack coil 400-2 may include multiple turns of winding coils. During the main magnet design, the greater the count of the multiple turns is, the better the main magnet may be. In some embodiments, during the main magnet design, a magnetic flux of the magnetic field B0 generated by the main magnet 202 may need to satisfy a preset condition (e.g., equal to or greater than a preset magnetic flux). The magnetic flux of the magnetic field B0 generated by the main magnet 202 may be related to the count of the multiple turns and a running current (e.g., a current passing though a turn of a winding coil).

In some embodiments, the uniformity/homogeneity of the main magnetic field may be better (e.g., lower) than 1 ppm within a certain range. Within the certain range and under the condition of active shimming and passive shimming (e.g., by setting iron pieces/sheets near the main magnetic field), the main magnetic field may maintain relatively high uniformity. In some embodiments, the certain range may include a three-dimensional area centered on the center of the imaging field of view of the MRI device. The three-dimensional area may include a spherical volume area, a cube area, a cuboid area, a cylinder area, an ellipsoid area, or the like. For example, the certain range may include a spherical volume area with a diameter greater than 50 cm, and the center of the imaging field of view of the MRI device may be taken as the center of the spherical volume area. More descriptions regarding the uniformity/homogeneity of the main magnetic field may be found elsewhere in the present disclosure (e.g., FIG. 8 and the relevant description thereof).

In some embodiments, the main magnet 202 may also include at least one shielding coil. The shielding coil may be configured to protect the main magnetic field from being disturbed by external factors, and/or limit the main magnetic field from spreading to the surrounding environment in the form of a stray magnetic field. In some embodiments, the direction of the current in the shielding coil may be opposite to the direction of the current in the main field coil, so that the shielding coil generates a reverse magnetic field to offset the stray magnetic field of the main magnetic field, thereby achieving the purpose of shielding.

In some embodiments, the shielding coil may include a first group of shielding coils and a second group of shielding coils oppositely arranged along the radial direction of the accommodation space, and located in a vacuum container of the MRI device. The first group of shielding coils may correspond to the first group of main field coils. The first group of shielding coils may be located outside the first group of main field coils (e.g., be located at the side of the first group of main field coils away from the axis of the accommodation space along the radial direction of the accommodation space 201). That is, in the radial direction of the accommodation space 201, the first group of shielding coils may be farther away from the axis of the accommodation space 201 than the first group of main field coils. The second group of shielding coils may correspond to the second group of main field coils and be located outside the second group of main field coils. In some embodiments, the first group of shielding coils and the second group of shielding coils may cover (e.g., be sleeved on) the outside of the first group of main field coils and the second group of main field coils respectively. In some embodiments, the shapes of a shielding coil and a main field coil may be the same or similar, for example, both the shielding coil and the main field coil may be saddle coils or cos-theta coils.

In some embodiments, the first group of shielding coils and the second group of shielding coils may respectively include at least one shielding coil. In some embodiments, at least two shielding coils of the first group of shielding coils and/or the second group of shielding coils may be stacked along the radial direction of the accommodation space. In some embodiments, the at least two main field coils of the first group of shielding coils and/or the second group of shielding coils may be tiled along the circumferential direction and/or the axial direction of the accommodation space. In some embodiments, the at least two shielding coils of the first group of shielding coils and/or the second group of shielding coils may be nested. More descriptions regarding the shielding coils may be found elsewhere in the present disclosure (e.g., FIG. 9 and the description thereof).

The one or more gradient coils may generate magnetic field gradients in X, Y, and/or Z directions. The magnetic field gradients may be superimposed on the main magnetic field generated by the main magnet 202 and distort the main magnetic field, such that the magnetic orientation of the object's protons can vary according to their positions within the gradient field, thereby allowing spatial coding of MR signals. In some embodiments, the one or more gradient coils may include X-direction (or axis) coils, Y-direction (or axis) coils, Z-direction (or axis) coils, or the like.

The one or more RF coils may transmit RF pulses to and/or receive MR signals from a target object (e.g., the target object 203 such as the body, a substance, or an object). In some embodiments, the RF coils may include RF transmit coils and/or RF receive coils. The RF transmit coils may emit RF pulse signals that can excite nuclei in the target object to resonate at the Larmor frequency. The RF receive coils may receive MR signals that are transmitted from the target object. In some embodiments, the RF transmit coils and the RF receive coils may be integrated into a single coil, e.g., a transmit/receive coil. The RF coils may include any one of various types, such as quadrature coils, phased array coils, or the like. In some embodiments, different RF coils 240 may be configured to scan different parts of the target object. For example, the RF coils 240 may include a head coils, knee coils, cervical coils, thoracic coils, temporomandibular joint (TMJ) coils, or the like. In some embodiments, the RF coils 240 may be classified as volume coils and local coils. For example, the volume coils may include cage coils, transverse electromagnetic coils, surface coils, or the like. As another example, the local coils may include solenoid coils, saddle coils, flexible coils, or the like.

In some embodiments, the MRI device 200 may include a vacuum container configured to form the accommodation space 201 extending along the axial direction. The main magnet 202 may be disposed in the vacuum container.

In some embodiments, the MRI device 200 may further include a couch 204. In some embodiments, at least a part of the couch 204 may move along the Z direction and enter the accommodation space 201 of the MRI device 200. In some embodiments, the target object 203 may be placed on the couch 204 and transported into the accommodation space 201. In some embodiments, at least a part of the couch 204 may move in two, three, four, five, or six dimensions.

It should be noted that the above descriptions are provided for illustration purposes, and not intended to limit the scope of the present disclosure. Many alternatives, modifications, and variations may be apparent to those of ordinary skills in the art. The features, structures, methods, and characteristics of the example embodiments described herein can be combined in various ways to obtain additional and/or alternative example embodiments. In some embodiments, However, such changes and modifications do not go beyond the scope of the present disclosure.

FIG. 3 is a schematic diagram illustrating exemplary main field coils according to some embodiments of the present disclosure. As shown in FIG. 3, the main field coils may include a racetrack coil 300-1, a saddle coil 300-2, a cos-theta coil 300-3, etc.

In some embodiments, a main field coil of the main field coils may include at least two bent parts. For example, the racetrack coil 300-1 may have a planar shape. The racetrack coil 300-1 may include bent parts 303, 304, 305, and 306. The bending directions of the bent parts 303, 304, 305, and 306 are shown by arrows in the racetrack coil 300-1. It can be seen that the bending directions of the bending parts 303, 304, 305, and 306 of the racetrack coil 300-1 correspond to a same plane 307 (as shown by the dashed line box in the racetrack coil 300-1). As another example, the saddle coil 300-2 may have a three-dimensional shape distributed on two or more planes. The saddle coil 300-2 may include at least bent parts 301 and 302. The bending directions of the bent parts 301 and 302 may be shown by arrows in the saddle coil 300-2. The bent part 301 of the saddle coil 300-2 may correspond to a plane 308, and the bent part 302 of the saddle coil 300-2 may correspond to a plane 309. As still another example, the cos-theta coil 300-3 may have a three-dimensional shape distributed on two or more planes. The cos-theta coil 300-3 may include at least bent parts 310 and 311. The bending directions of the bent parts 310 and 311 may be shown by arrows in the cos-theta coil 300-3. The bent part 310 of the cos-theta coil 300-3 may correspond to the plane 312, and the bent part 311 of the cos-theta coil 300-3 may correspond to the plane 313.

In some embodiments, a main magnet of an MRI device (e.g., the main magnet 202 of the MRI device 200) may include a first group of main field coils and a second group of main field coils arranged oppositely along a radial direction of an accommodation space (e.g., the accommodation space 201) of the MRI device. For example, the first group of main field coils may include the saddle coil 300-2, the second group of main field coils may include the saddle coil 300-4, and the accommodation space 201 may be located between the saddle coil 300-2 and the saddle coil 300-4. As another example, the first group of main field coils may include the cos-theta coil 300-3, the second group of main field coils may include the cos-theta coil 300-5, and the accommodation space 201 may be located at the cos-theta coil 300-3 and the cos-theta coil between 300-5. The Z direction in FIG. 3 may correspond to the Z direction in FIG. 2.

Figure 5:
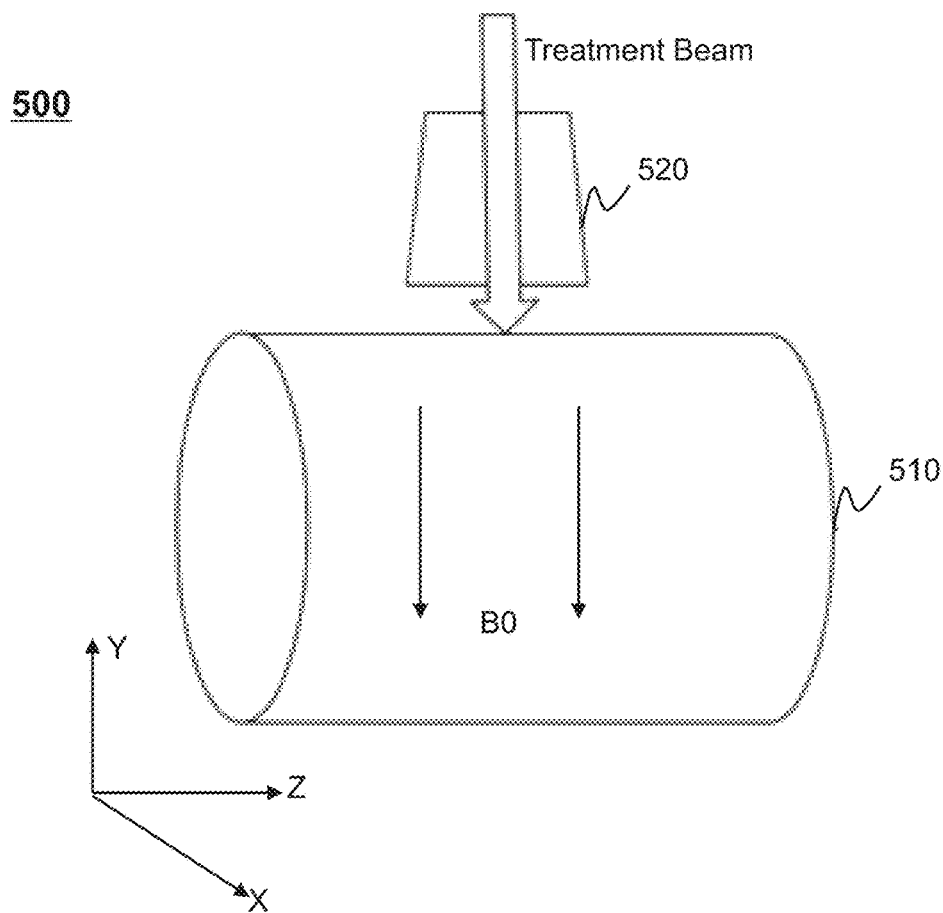
FIG. 5 is a schematic diagram illustrating an exemplary medical device according to some embodiments of the present disclosure.

FIG. 5 is a schematic diagram illustrating an exemplary medical device according to some embodiments of the present disclosure. As shown in FIG. 5, the medical device 500 may include an MRI device 510 and a radiotherapy device 520.

In some embodiments, the MRI device 510 may include a main magnet including at least one group of main field coils and configured to generate a main magnetic field for imaging a target object. The target object may be accommodated in an accommodation space (e.g., the accommodation space 201) extending along an axial direction (e.g., the Z direction as shown in FIG. 5). In some embodiments, the MRI device 510 may include a vacuum container configured to form the accommodation space extending along the axial direction. The main magnet of the MRI device 510 may be disposed in the vacuum container. The vacuum container may be mounted on a gantry of the MRI device 510, such that the vacuum container is capable of rotating around an axis of the accommodation space with respect to the gantry. In some embodiments, the MRI device 510 may include at least one group of shielding coils configured to shield the at least one group of main field coils and prevent the at least one group of main field coils from interfering with a radiation source of the radiotherapy device 520 during treating the target object. The MRI device 510 may be the same as or similar to the MRI device 200 as described in FIG. 2. More descriptions regarding the MRI device 510 and the components thereof (e.g., the at least one group of main field coils of the main magnet, the vacuum container, or the at least one group of shielding coils) may be found in FIG. 2 and relevant descriptions thereof. The X, Y, and Z directions in FIG. 5 may correspond to the X, Y, and Z directions as shown in FIG. 2.

The radiotherapy device 520 may be configured to treat a target object. The radiotherapy device 520 may include a radiation source disposed outside of the vacuum container of the MRI device 510. In some embodiments, the radiation source may be disposed at a first opening hole of the vacuum container of the MRI device 510. The radiation source and the vacuum container may be configured to rotate synchronously. The radiation source may be configured to deliver/transmit a treatment beam (e.g., a radiation beam) to at least one part of a region of interest (ROI) of the target object. The treatment beam may include particle rays, photon rays, or the like. The particle rays may include neutrons, protons, electrons, muons, heavy ions, alpha rays, or the like, or any combination thereof. The photon rays may include X-rays, gamma rays, ultraviolet rays, lasers, or the like, or any combination thereof. In some embodiments, the main magnet of the MRI device 510 and the radiation source of the radiotherapy device 520 may rotate around an axis of the accommodation space synchronously. In some embodiments, the radiotherapy device 520 may further include a detector (not shown) configured to receive the treatment beam/radiation beam. The detector may be arranged oppositely to the radiation source. The detector may be disposed at a second opening hole of the vacuum container. The second opening hole and the first opening hole may be arranged on two sides of the vacuum container oppositely. The detector and the radiation source may be arranged along a radial direction of the MRI device 510. The detector may rotate together with the radiation source. More descriptions regarding the first opening hole and the second opening hole may be found elsewhere in the present disclosure (e.g., FIG. 2 and relevant descriptions thereof).

In some embodiments, the medical device 50 may include at least two gantries. For example, the medical device 500 may include a first gantry (also referred to as a gantry of the radiotherapy device 520) and a second gantry (also referred to as a gantry of the MRI device 510). The first gantry may be configured to fix the radiation source of the radiotherapy device 520, and the second gantry may be configured to fix the vacuum container of the MRI device 510.

In some embodiments, a direction of the main magnetic field generated by the main magnet of the MRI device 510 may be the same or substantially same as a direction of a central ray of the radiation source. That is, a deviation between a direction of the main magnetic field generated by the main magnet of the MRI device 510 and a direction of a central ray of the radiation source may be less than or equal to a threshold. The threshold may relate to at least one of an intensity of the main magnetic field or a size of a wall surface of the radiation source (e.g., a size of a wall surface of an accelerator of the radiation source).

It should be noted that the above descriptions are provided for illustrative purposes, and are not intended to limit the scope of the present disclosure. For those with ordinary skills in the art, various changes or modifications can be made under the teaching of the present disclosure. For example, the radiotherapy device 520 may further include a linear accelerator configured to accelerate electrons, ions, or protons, a dose detection device, a temperature control device (e.g., a cooling device), a multi-layer collimator, or the like, or any combination thereof. However, these changes and modifications do not depart from the scope of the present disclosure.

In some embodiments, the direction of the treatment beam emitted by the radiation source may be perpendicular to the axis of the accommodation space of the MRI device 510. As used herein, the direction of the treatment beam emitted by the radiation source may refer to an axial direction of the treatment beam. In some embodiments, the main magnet of the MRI device 510 may rotate synchronously with the radiation source around the axial direction of the accommodation space, so that the projection of the radiation source along the radial direction of the accommodation space at least partially falls within a region surrounded by a first group of main field coils or a second group of main field coils of the MRI device 510. For example, as shown in FIG. 5, the main magnet of the MRI device 510 may rotate synchronously with the radiation source around the axial direction of the accommodation space, so that the direction of the treatment beam emitted by the radiation source can be substantially the same as the direction of the main magnetic field B0.

In some embodiments, the uniformity of the main magnetic field of the MRI device 510 may be better (e.g., lower) than 1 ppm within a certain range. Within the certain range, the direction of the main magnetic field may be consistent with (e.g., the same or substantially same as) the direction of the treatment beam emitted by the radiation source, and under the conditions of active shimming and passive shimming, a high uniformity may be maintained. In some embodiments, the certain range may include a three-dimensional area centered on the center of the imaging field of view of the MRI device 510, for example, a spherical volume area, a cube area, a cuboid area, a cylinder area, an ellipsoid area, or the like. For example, the certain range may include a spherical volume area with a diameter greater than 50 cm and centered on the center of the imaging field of view of the MRI device 510. As another example, the main magnet and the radiation source of the MRI device 510 may be rotated by any angle around the axis, such as 90 degrees, 180 degrees, 360 degrees, 450 degrees, or 540 degrees. During the radiotherapy process, the MRI device 510 may rotate together with the radiotherapy device 520, which can realize functions such as real-time image guidance during treatment.

In some embodiments, the radiotherapy device 520 may rotate together with the MRI device 510. For example, the radiotherapy device 520 and the MRI device 510 may be installed on the same gantry and rotate together with the gantry. In some embodiments, the radiotherapy device 520 and the MRI device 510 may rotate independently. For example, the radiotherapy device 520 and the MRI device 510 may be mounted on different gantries. The radiotherapy device 520 and the MRI device 510 may rotate synchronously and independently. In some embodiments, the radiotherapy device 520 (e.g., the radiation source, the detector, the collimator, etc.) may be relatively fixedly installed on the main magnet of the MRI device 510. The radiation therapy 520 may rotate together with the main magnet.

According to some embodiments of the present disclosure, the direction of the main magnetic field B0 generated by the MRI device 510 may be substantially consistent with the direction of the treatment beam, which can reduce the transverse deviation of the radiation beam to the greatest extent, and the treatment beam can be stable and accelerated in a strong magnetic field. In some embodiments, the MRI device 510 may be designed to have a central magnetic field with a higher strength or intensity, for example, greater than 1.5 T, for MRI magnetic resonance imaging. In addition, when the main magnetic field B0 generated by the MRI device 510 is consistent with the direction of the treatment beam, the loss of the radiation beam hitting the wall of the volume container caused by the main magnetic field may be avoided or reduced in the acceleration or transmission path, thereby improving a dosage rate of the MRI-guided RT device. Further, the treatment beam may reach the isocentric area of the accommodation space of the MRI device 510 with higher transmission efficiency, which reduces the design and processing difficulty of the magnetic shielding of the magnet, thereby ensuring the uniformity of the magnetic field of the main magnet.

Figure 6:
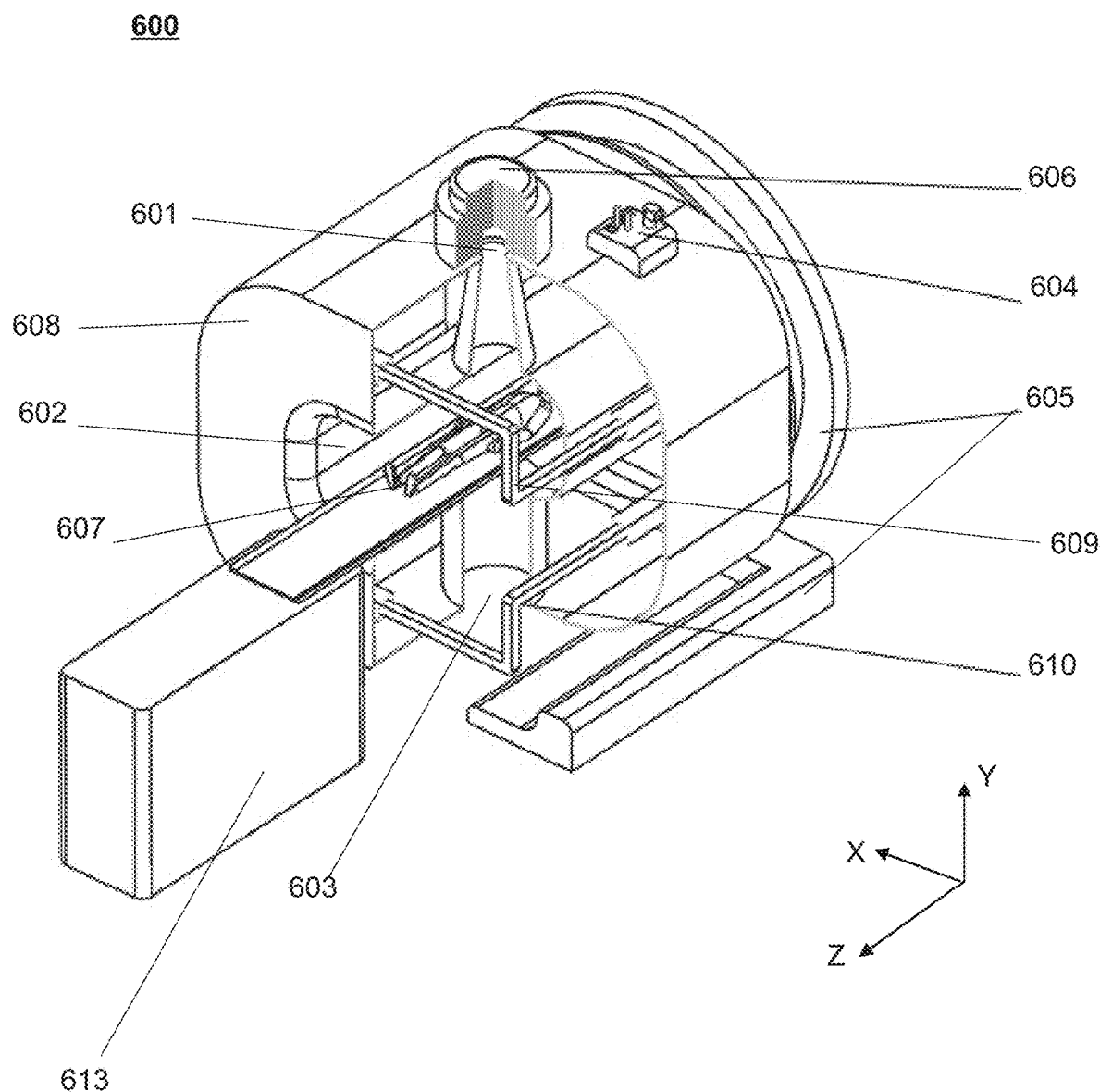
FIG. 6 is a schematic diagram illustrating an exemplary medical device according to some embodiments of the present disclosure.

FIG. 6 is a schematic diagram illustrating an exemplary medical device according to some embodiments of the present disclosure. In some embodiments, the medical device 600 may be the same as or similar to the MRI device 200 as shown in FIG. 2. The X, Y, and Z directions in FIG. 6 may correspond to the X, Y, and Z directions in FIG. 2.

As shown in FIG. 6, the medical device 600 may include an MRI device (which is the same as or similar to the MRI device 200). The MRI device may include a main magnet 608. The main magnet 608 may form an accommodation space 602 extending along an axial direction (e.g., the Z direction shown in FIG. 6) for accommodating a target object 607. The MRI device may further include a couch 613. In some embodiments, at least a part of the couch 613 may move along the Z direction and enter the accommodation space 602 of the medical device 600. The target object 607 may be placed on the couch 613 and transported into the accommodation space 602. The main magnet 608 may include a first group of main field coils 609 and a second group of main field coils 610 that are oppositely arranged along a radial direction (e.g., the y-axis direction) of the accommodation space 602. The accommodation space 602 may be located between the first group of main field coils 609 and the second group of main field coils 610. The first group of main field coils 609 and/or the second group of main field coils 610 may include at least one main field coil that has a three-dimensional shape that is not on the same plane (e.g., a saddle coil, or a cos-theta coil). For example, as shown in FIG. 6, the first group of main field coils 609 and the second group of main field coils 610 may include saddle coils.

In some embodiments, as shown in FIG. 6, the MRI device may include at least one first opening hole (e.g., a first through hole) 601. The medical device 600 may also include a radiotherapy device (which is the same as or similar to the radiotherapy device 520). The treatment beam/radiation beam emitted by a radiation source 606 of the radiotherapy device may be delivered towards at least one part of an ROI of the target object 607 located in the accommodation space 602 through the first opening hole 601. By opening a through hole on the main magnet 608 of the medical device 600, the mechanical structure strength of the main magnet may be increased and the stability of the magnet may be improved. The radiation source 606 may be installed above the through hole, and higher particles transmission efficiency may be kept at the opening (e.g., the first opening hole 601), which enables the treatment beam to reach the isocentric target area without being blocked, improves the utilization rate of radiation rays, and finally increases the dose rate.

In some embodiments, the MRI device may include at least one second opening hole 603. The at least one second opening hole 603 may be oppositely arranged to the at least one first opening hole 601 along the radial direction of the accommodation space 602. The treatment beam of the radiotherapy device may be received by a detector of the radiotherapy device through the second opening hole 603. For example, the first opening hole 601 and the second opening hole 603 may be disposed on a vacuum container of the MRI device and oppositely arranged along the radial direction of the accommodation space 602. In some embodiments, the first opening 601 hole and/or the second opening hole 603 may include any shape, for example, circular, oval, rectangular, etc., which is not limited in the present disclosure.

In some embodiments, the first opening hole 601 may be opened between two coils of the first group of main field coils, or opened in a region surrounded by one coil of the first group of main field coils. In some embodiments, the first opening hole 601 may be opened on a side of the first group of main field coils away from the target object 607 along the radial direction of the accommodation space 602. As shown in FIG. 6, the first opening hole 601 may be opened on the side of first group of main field coils 609 that is away from the target object 607 along the radial direction of the accommodation space 602. In some embodiments, the second opening hole 603 may be opened between two coils of the second group of main field coils, or opened in an area surrounded by one coil of the second group of main field coils. In some embodiments, the second opening hole 603 may be opened on the side of the second group of main field coils away from the target object 607 along the radial direction of the accommodation space 602 (as shown in FIG. 6, the second opening hole 603 is opened on the second group of main field coils). The second group of main field coils 610 may be disposed away from the side of the target object 607 along the radial direction of the accommodation space 602).

In some embodiments, the MRI device may include at least two first opening holes 601. The at least two first opening holes 601 may be arranged side by side along the axial direction of the accommodation space 602 or the circumferential direction of the accommodation space 602. The radiation source 606 of the radiotherapy device may be mounted above one of the at least two first opening holes 601. The at least two first opening holes 601 may be configured to match the shape of the radiation source 606. In some embodiments, the MRI device may include at least two second opening holes 603. The at least two second opening holes 603 may be arranged side by side along the axial direction of the accommodation space 602 or the circumferential direction of the accommodation space 602. A detector of radiotherapy device may be installed at one of the second opening holes 603. Similarly, the at least two second opening holes 601 may be configured to match the shape of the radiation source 606. In some embodiments, the counts of the first opening holes 601 and the second opening holes 603 may be the same or different.

In some embodiments, the MRI device may further include a gantry 605 for supporting the main magnet 608. The main magnet 608 may rotate relative to the gantry 605. The main magnet 608 may be installed on the gantry 605, and the relative rotation between the main magnet 608 and the gantry 605 may be realized through, for example, a bearing. In some embodiments, the radiotherapy device (e.g., the radiation source 606, the detectors, the collimators, etc.) and the main magnet 608 may be mounted on the gantry 605 and rotate together. In some embodiments, the radiotherapy device (e.g., the radiation source 606, the detector, the collimator, etc.) may be mounted on a gantry different from the gantry 605. The radiotherapy device and the main magnet 608 may rotate synchronously but independently. For example, the gantry of the radiation therapy may have a ring shape disposed around the main magnet 608. The radiation source 606, the detector, and the collimator may be mounted on the circumference of the gantry of the radiation therapy. As another example, the gantry of the radiotherapy device may be located at the back of the medical device 600. The radiation source 606 may be mounted on the gantry of the radiation therapy via a treatment arm. In some embodiments, the main magnet 608 may be relatively fixed to the gantry 605 or the gantry of the radiotherapy device through a suspension device. In some embodiments, the suspension device may use a tie rod of titanium alloy, so that the main magnet 608 can bear various motion conditions. In some embodiments, the suspension device may be provided with a temperature node or a segmented design to reduce the heat leakage of the main magnet 608.

In some embodiments, the radiotherapy device (e.g., the radiation source 606, the detector, the collimator, etc.) may be relatively fixedly mounted on the main magnet 608. For example, the radiation source 606 and/or the collimator may be installed at the first opening hole 601 and rotate together with the main magnet 608. As another example, the detector (not shown in FIG. 6) may be installed at the second opening hole 603 and rotate together with the main magnet 608.

In some embodiments, the MRI device may further include at least one cooling device 604 for cooling the main magnet 608 (e.g., at least one group of main field coils of the main magnet 608). In some embodiments, the at least one group of main field coils may be cooled by liquid helium immersion cooling, conduction cooling, etc. The cooling device 604 may be configured for connecting an external vacuum vessel and an internal heat shielding layer of a cryogenic container of the medical device 600. The cooling device 604 may also be configured for fixing the main magnet 608 to an external supporting structure (e.g., the gantry 605). In some embodiments, if the medical device 600 rotates together with the radiotherapy device, when the system (e.g., the medical system 100) starts and stops, especially when the system needs to stop suddenly in response to that a safety interlock is triggered, the structure of the main magnet 608 may bear certain acceleration loads.

Figure 7:
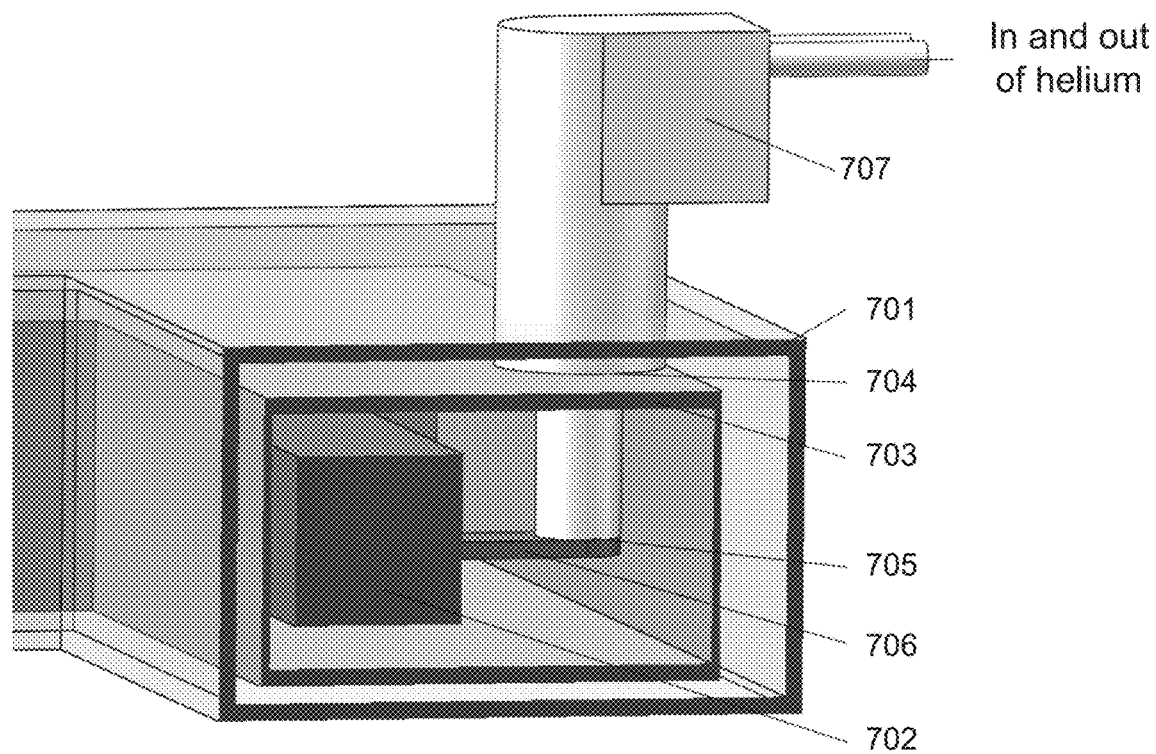
FIG. 7 is a schematic diagram illustrating exemplary conduction cooling according to some embodiments of the present disclosure.

FIG. 7 is a schematic diagram illustrating exemplary conduction cooling according to some embodiments of the present disclosure. In some embodiments, a main magnet (e.g., the main magnet 202, or the main magnet 608) may include a superconducting magnet. The superconducting magnet may be cooled by conduction cooling. That is, coils of the superconducting magnet may be directly connected to a cold head of a refrigerator through a conductive cooling structure to realize the cooling of the main magnet. As shown in FIG. 7, a superconducting magnet 702 may be arranged in a vacuum container 701. There may be a thermal shielding layer 703 between the superconducting magnet 702 and the vacuum container 701 to reduce the radiation heat transfer. The shielding layer 703 may be connected to an end plate 704 of a primary cold head of the refrigerator. The superconducting magnet 702 may be connected to an end plate 705 of a secondary cold head of the refrigerator through a cooling structure 706.

In comparison with liquid helium immersion cooling, the conduction cooling may have a certain temperature difference in the structures such as the coil and the magnet skeleton used to support the coil. In order to improve the reliability of superconducting magnets and reduce the temperature difference of heat transfer, the superconducting magnets may use aluminum alloy with high thermal conductivity as an inner skeleton. The aluminum alloy inner skeleton and high-purity oxygen-free copper or high-purity aluminum may form a uniform temperature structure. A contact interface between the coils and the magnet skeleton may adopt indium foil crimping to improve contact thermal resistance. Further, in comparison with the liquid helium immersion cooling, the conduction cooling may need less liquid helium and have lower operating costs. In addition, the conduction cooling may not need to immerse the superconducting coils in liquid helium, which avoids/reduce the quenching of the superconducting coils caused by the change of the liquid helium level due to the rotation of the main magnet.

Figure 8:
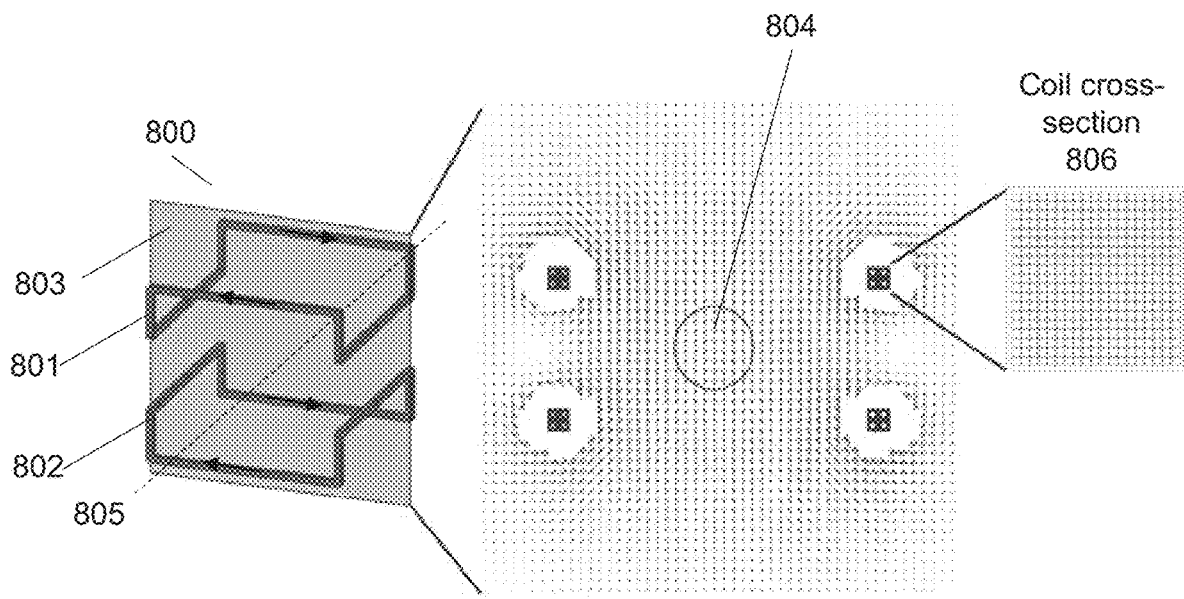
FIG. 8 is a schematic diagram illustrating an exemplary main magnet of an MRI device according to some embodiments of the present disclosure.

FIG. 8 is a schematic diagram illustrating an exemplary main magnet of an MRI device according to some embodiments of the present disclosure. As shown in FIG. 8, the main magnet 800 may include saddle coils. The main magnet 800 may include a first group of main field coils 801 and a second group of main field coils 802 oppositely arranged along a radial direction of an accommodation space of the MRI device The first group of main field coils 801 and the second group of main field coils 802 may form a dipole field region between the first group of main field coils 801 and the second group of main field coils 802, thereby generating a main magnetic field that forms a predetermined angle (e.g., greater than 0 degrees and less than or equal to 90 degrees) with an axial direction of the accommodation space, for example, generating the main magnetic field perpendicular to the axial direction. For instance, as shown in FIG. 8, a clockwise current (e.g., in the direction of the arrow in FIG. 8) may pass through the first group of main field coils 801 and the second group of main field coils 802, which can generate a magnetic field as shown in FIG. 8 in a cross-section 803. The cross-section 803 may be perpendicular to the axis 805 and located in the middle of the main magnet 800 along the direction of the axis 805. A coil cross-section 806 may be one cross-section of the first group of coils 801 in the cross-section 803. The uniformity of the magnetic field generated by the first group of main field coils 801 and the second group of main field coils 802 within a spherical volume area may be better (e.g., lower) than 1 ppm. The spherical volume area may be located at the center of the accommodation space formed by the first group of main field coils 801 and the second group of main field coils 802, and the axis 805 may pass through the center of the spherical volume area. The region 804 may be a central region of the spherical volume corresponding to the cross-section 803 in the spherical volume region.

FIG. 9 is a schematic diagram illustrating an exemplary main magnet according to some embodiments of the present disclosure. As shown in FIG. 9, the main magnet 900 may include saddle coils. The main magnet 900 may include a first group of main field coils 901 and a second group of main field coils 902 that respectively include three nested saddle main field coils. The main magnet 900 may also include a first group of shielding coils 903 and a second group of shielding coils 904 that are oppositely arranged along a radial direction of an accommodation space of the MRI device. The first group of shielding coils 903 may correspond to the first group of main field coils 901, and the second group of shielding coils 904 may correspond to the second group of main field coils 902. The first group of shielding coils 903 and the second group of shielding coils 904 may respectively include a saddle shielding coil, which are sleeved on the outside of the first group of main field coils 901 and the second group of main field coils 902 respectively.

The above descriptions are provided for illustration purposes, and not intended to limit the scope of the present disclosure. Many alternatives, modifications and variations may be apparent to those of ordinary skills in the art. The features, structures, methods, and characteristics of the example embodiments described herein can be combined in various ways to obtain additional and/or alternative example embodiments. For example, the radiotherapy device in the present disclosure may be replaced by a CT device or an X-ray device. That is, the MRI device in the present disclosure may form a multi-modality imaging device with the CT device or the X-ray device. The MRI device may rotate synchronously with the CT device or the X-ray device, so that the axial direction of the radiation beam emitted by the radiation source of the CT device or the X-ray device may be the same (or substantially same) as the direction of the main magnetic field of the MRI device. However, such changes and modifications do not go beyond the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system."

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A magnetic resonance imaging (MRI) device, comprising:
   a main magnet configured to generate a main magnetic field, wherein
      the main magnet forms an accommodation space configured to accommodate a target object; and
      the main magnet includes at least one group of main field coils, wherein the at least one group of main field coils includes a first group of main field coils and a second group of main field coils that are arranged oppositely along a radial direction of the accommodation space, the first group of main field coils and the second group of main field coils bending towards each other;
      wherein the at least one group of main field coils includes a saddle coil that is wound around the radial direction, the saddle coil includes a first segment that is a straight segment, a second segment, and a third segment the first segment is along a direction vertical to the radial direction and a central axis of the accommodation space along which the accommodation space extends, any two of the first segment, the second segment, and the third segment are angled with each other, the first segment and the second segment define a first plane, the second segment and the third segment define a second plane, and there is an angle between the first plane and the second plane.

2. A system, comprising:
   a vacuum container configured to form an accommodation space extending along an axial direction and configured to accommodate a target object;
   a main magnet including at least one group of main field coils and configured to generate a main magnetic field for performing magnetic resonance imaging on the target object, wherein the main magnet is disposed in the vacuum container, and the at least one group of main field coils includes a first group of main field coils and a second group of main field coils that are oppositely arranged along a radial direction of the accommodation space; and
   a radiation source configured to treat the target object, wherein the radiation source is disposed at a first opening hole of the vacuum container, a direction of the main magnetic field is the same or substantially same as a direction of a central ray of the radiation source, a deviation between the direction of the main magnetic field and the direction of the central ray of the radiation source is less than or equal to a threshold, and the threshold relates to an intensity of the main magnetic field and a size of a wall surface of the radiation source.

3. The MRI device of claim 1, further comprising:
   a radiography component including a radiation source, wherein the radiation source is configured to transmit a radiation beam to at least one part of a region of interest (ROI) of the target object.

4. The system of claim 2, wherein
   the radiation source and the vacuum container are configured to rotate synchronously.

5. The system of claim 2, further comprising a detector configured to receive a radiation beam of the radiation source, wherein the detector is arranged oppositely to the radiation source.

6. The system of claim 2, further comprising a gantry, the vacuum container being mounted on the gantry, such that the vacuum container is capable of rotating around an axis of the accommodation space with respect to the gantry.

7. The system of claim 2, further comprising at least two gantries, a first gantry of the at least two gantries being configured to fix the radiation source, and a second gantry of the at least two gantries being configured to fix the vacuum container.

8. The system of claim 2, further comprising at least one group of shielding coils configured to shield the at least one group of main field coils and prevent the at least one group of main field coils from interfering the radiation source in treating the target object;
   wherein the at least one group of shielding coils includes a first group of shielding coils and a second group of shielding coils oppositely arranged along the radial direction of the accommodation space, and located in the vacuum container; each shielding coil in the at least one group of shielding coils is wound around the radial direction; the first group of shielding coils is located at a side of the first group of main field coils away from an extending axis of the accommodation space along the radial direction; the second group of shielding coils is located at a side of the second group of main field coils away from the extending axis of the accommodation space along the radial direction; the first group of shielding coils and the second group of shielding coils are sleeved on an outside of the first group of main field coils and the second group of main field coils, respectively.

9. The MRI device of claim 1, wherein the first segment and the third segment are connected with two ends of the second segment, respectively; and along the radial direction, the third segment is closer to the central axis of the accommodation space.

10. The MRI device of claim 1, wherein the second segment and the third segment are straight segments; any two of the first segment, the second segment, and the third segment form a right angle; the second segment is along the radial direction, and the third segment is along the central axis of the accommodation space.

11. The MRI device of claim 1, wherein the at least one group of main field coils includes a coil including a plurality of segments with different thicknesses.

12. The MRI device of claim 1, wherein
a main field coil of at least one group of main field coils include a sixth segment and a seventh segment;
the sixth segment and the seventh segment are parallel to each other, along the central axis of the accommodation space, and spaced apart, along the direction vertical to the central axis and the radial direction, from each other at a predetermined distance; and
the greater the predetermined distance is, and/or the thicker the sixth segment and the seventh segment are, the better the main magnet is.

13. The MRI device of claim 1, wherein the second segment and the third segment are straight segments; any two of the first segment, the second segment, and the third segment form a right angle; the first segment and the third segment are connected with two ends of the second segment, respectively; the second segment is along the radial direction, and the third segment is along the central axis of the accommodation space; and along the radial direction, the third segment is closer to the central axis than the first segment;
the saddle coil further includes an eighth segment that is a straight segment;
the third segment and the eighth segment are parallel to each other, and spaced apart, along the direction vertical to the central axis and the radial direction, from each other at a predetermined distance; and
the greater the predetermined distance is, and/or the thicker the third segment and the eighth segment are, the better the main magnet is.

14. The MRI device of claim 3, further comprising:
at least one first opening hole through which the radiation beam is delivered towards the at least one part of the ROI of the target object.

15. The system of claim 5, wherein
the vacuum container includes a second opening hole,
the detector is disposed at the second opening hole, and
the second opening hole and the first opening hole are arranged on two sides of the vacuum container oppositely.

16. The MRI device of claim 11, wherein the plurality of segments include a fourth segment parallel to the central axis of the accommodation space, and a fifth segment that is vertical to the central axis and the radial direction, and a thickness of the fifth segment is greater than a thickness of the fourth segment.

17. The MRI device of claim 3, further comprising: at least two first opening holes; wherein:
the radiation beam is delivered towards the at least one part of the ROI of the target object through one of the at least two first opening holes; and
the at least two first opening holes are arranged side by side along the central axis or a circumferential direction of the accommodation space.

18. The system of claim 8, wherein at least two shielding coils of the first group of shielding coils or the second group of shielding coils are stacked along the radial direction.

19. The system of claim 8, wherein at least two shielding coils of the first group of shielding coils or the second group of shielding coils are tiled along a circumferential direction or the axial direction of the accommodation space.

20. The system of claim 8, wherein at least two shielding coils of the first group of shielding coils or the second group of shielding coils are nested.

* * * * *